United States Patent
Nygaard (10) Patent No.: US 12,298,016 B2
(45) Date of Patent: May 13, 2025

(54) FAN ARRAY DIAGNOSTIC AND MONITORING SYSTEM AND METHOD

(71) Applicant: Coil Master Corporation, Moscow, TN (US)

(72) Inventor: Timothy Nygaard, Waconia, MN (US)

(73) Assignee: Coil Master Corporation, Moscow, TN (US)

( * ) Notice: Subject to any disclaimer, the term of this patent is extended or adjusted under 35 U.S.C. 154(b) by 527 days.

(21) Appl. No.: 17/685,976

(22) Filed: Mar. 3, 2022

(65) Prior Publication Data

US 2022/0307712 A1    Sep. 29, 2022

Related U.S. Application Data

(60) Provisional application No. 63/165,432, filed on Mar. 24, 2021.

(51) Int. Cl.

| | |
|---|---|
| *H02P 7/00* | (2016.01) |
| *F24F 7/007* | (2006.01) |
| *F24F 11/38* | (2018.01) |
| *F24F 11/52* | (2018.01) |
| *F24F 11/61* | (2018.01) |
| *H02P 25/00* | (2006.01) |
| *H02P 25/30* | (2006.01) |

(52) U.S. Cl.
CPC ............. *F24F 11/38* (2018.01); *F24F 7/007* (2013.01); *F24F 11/52* (2018.01); *F24F 11/61* (2018.01); *H02P 25/00* (2013.01)

(58) Field of Classification Search
CPC ...................................... F04B 49/06

USPC ........................................... 318/152
See application file for complete search history.

(56) References Cited

U.S. PATENT DOCUMENTS

| | | | |
|---|---|---|---|
| 9,188,355 B1* | 11/2015 | Allen | F24F 11/77 |
| 10,138,901 B2 | 11/2018 | Benson et al. | |
| 2014/0192436 A1* | 7/2014 | Kwon | G11B 5/59694 |
| | | | 360/75 |
| 2021/0003302 A1 | 1/2021 | Kobayashi | |
| 2022/0408590 A1* | 12/2022 | Cheng | H05K 7/20136 |

FOREIGN PATENT DOCUMENTS

WO    2020054525 A1    3/2020

OTHER PUBLICATIONS

International Search Report issued by ISA/EPO in connection with PCT/US2022/021516 on Jun. 27, 2022.
Written Opinion issued by ISA/EPO in connection with PCT/US2022/021516 on Jun. 27, 2022.

* cited by examiner

*Primary Examiner* — Erick D Glass
(74) *Attorney, Agent, or Firm* — Arnold & Porter Kaye Scholer LLP (57) ABSTRACT

An air-handling system includes one or more fan arrays that each include a plurality of fan assemblies. Each fan assembly includes a motor operatively connected to an impeller, and a motor controller operatively connected to the motor. A control module is operatively connected to the motor controllers and is configured to determine a status of the operating parameters of each motor controller based on actual parameter value information received from the motor controller and expected parameter value information.

8 Claims, 3 Drawing Sheets

FAN ARRAY DIAGNOSTIC AND MONITORING SYSTEM AND METHOD

CROSS-REFERENCE TO RELATED APPLICATION DATA

This application claims the benefit of and priority to Provisional U.S. Patent Application Ser. No. 63/165,432, filed Mar. 24, 2021, titled FAN ARRAY DIAGNOSTIC AND MONITORING SYSTEM AND METHOD, the disclosure of which is incorporated herein in its entirety.

BACKGROUND

This disclosure relates generally to air-handling systems. More specifically, this disclosure relates to diagnostic and monitoring systems for fan arrays.

Air-handling systems are utilized to move air according to desired ventilation parameters for the environment of the system. The air-handling systems can be controlled to provide desired volumetric flow rate and desired pressure for the environment. One example of an air handling system is a unit including components configured to work together to condition air as part of a primary ventilation system for structures, such as a rooftop unitary system. Some examples include stand-alone fan assemblies for moving air. Air-handling systems can utilize one or more fan arrays formed from multiple individual fans to move the air instead of a single fan structure. The individual fans form a fan array and work in parallel to generate the required output from that fan array.

The individual fans forming a fan array can be electronically operated. For example, a variable frequency drive can be used to vary the speeds of the fans in the fan array. Some examples can include fans powered by electronically commutated (EC) motors. Powering the individual fans with EC motors provides direct control over the individual fans. The parallel operation of the fans forming a fan array means that the operating parameters of each of the individual fans need to be accurate for the fan array and air-handling system including that fan. The operating parameters of each EC motor can be set according to the particular fan array and system that the fan is within. The operating parameters can be field-programmable to be changed in case a fan requires replacement, repair, or redeployment.

SUMMARY

According to an aspect of the disclosure, a method of fan array control includes generating, by a control module, a first parameter status inquiry and sending the first parameter status inquiry to a first motor controller of a first fan assembly of a first fan array; receiving, at the control module, a first actual parameter value of a first operating parameter from the first motor controller; comparing, by the control module, the first actual parameter value and a first expected parameter value of the first operating parameter; determining, by the control module, a parameter status of the first motor controller based on the comparison of the first actual parameter value and the first expected parameter value; and writing, by the control module, the first expected parameter value to the first motor controller as the first actual parameter value of the first operating parameter based on the parameter status being an invalid parameter status.

According to an additional or alternative aspect of the disclosure, an air-handling system includes a first fan array and a control module including control circuitry and memory. The first fan array includes a first fan assembly having a first motor operatively connected to a first impeller, the first motor including a first motor controller; and a second fan assembly having a second motor operatively connected to a second impeller, the second motor including a second motor controller. The control module is operatively connected to the first fan assembly and the second fan assembly. The control module is configured to generate a first parameter status inquiry; send the first parameter status inquiry to the first motor controller; receive a first actual parameter value from the first motor controller in response to the first parameter status inquiry; compare the first actual parameter value and a first expected parameter value; determine a parameter status of the first motor controller based on the comparison of the first actual parameter value and the first expected parameter value; and write the first expected parameter value to the first motor controller as the first actual parameter value based on the parameter status of the first actual parameter value being an invalid parameter status.

According to another additional or alternative aspect of the disclosure, a diagnostic and monitoring method for an air-handling system includes determining, by a control module and for a first fan array including a plurality of first fan assemblies, a plurality of parameter statuses of a plurality of first motor controllers of each first fan assembly of the plurality of first fan assemblies based on a comparison of a first actual parameter value received from the first motor controller and a first expected parameter value recalled from a memory of the control module; wherein the control module is configured to determine a parameter status of a target first motor controller prior to determining a parameter status of a next first motor controller.

DETAILED DESCRIPTION

Air-handling systems include one or more fan arrays to generate the required airflow for the environment of the air-handling system. Fan arrays, according to the disclosure, are formed by multiple individual fan assemblies that are each powered by an electronically commutated (EC) electric motor. The EC motor is connected to an impeller to power the rotation of the impeller. Each impeller can be in a direct drive arrangement with its motor. The multiple fan assemblies of a fan array operate in parallel to provide the desired airflow output for the portion of the air-handling system formed by the fan array. Each EC motor includes a dedicated motor controller to control the output of the fan assembly of that EC motor. A system controller controls operation of each fan assembly by way of the motor controller of that fan assembly. The system controller can determine the operating status of each fan assembly based on an actual parameter value and an expected parameter value for the EC motor.

The system controller can take action to correct errors based on the comparison of the actual parameter status and the expected parameter status.

Figure 1A:
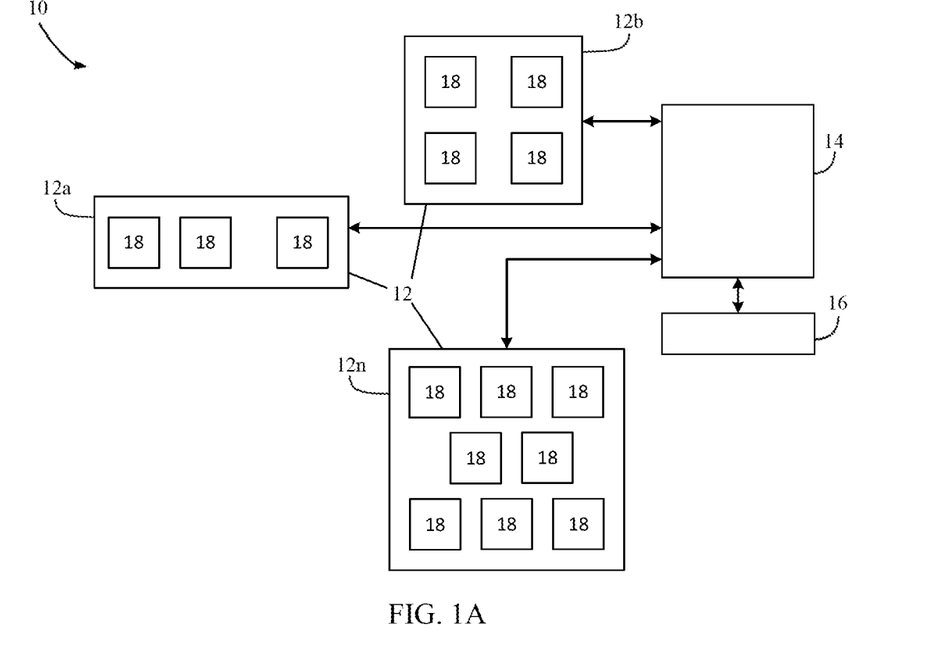
FIG. 1A is a schematic block diagram of an air-handling system, according to an example of the present disclosure.
Figure 1B:
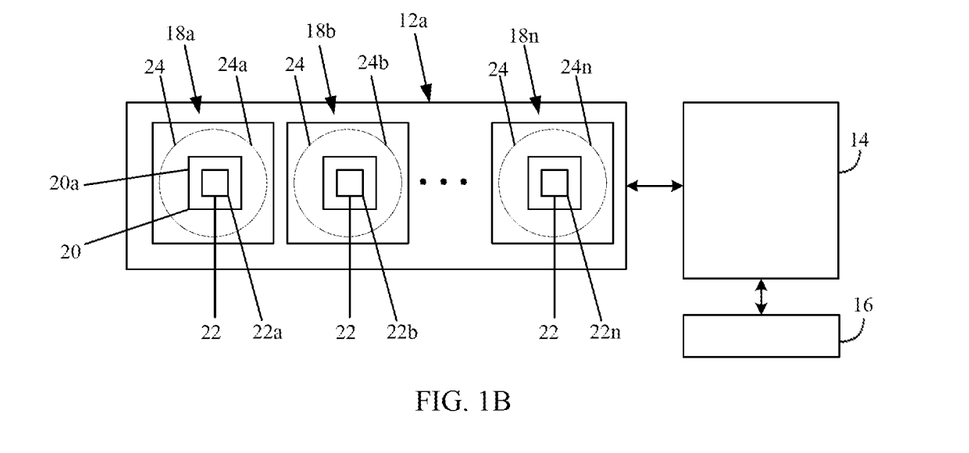
FIG. 1B is a schematic block diagram of a fan array and controller, according to an example of the present disclosure.

FIG. 1A is a schematic block diagram of air-handling system 10. FIG. 1B is a schematic block diagram of fan array 12. FIGS. 1A and 1B will be discussed together. Air-handling system 10 includes fan arrays 12, control module 14, and user interface 16. Each fan array 12 includes a plurality of fan assemblies 18. Each fan assembly 18 includes motor 20 (FIG. 1B), motor controller 22 (FIG. 1B), and impeller 24 (FIG. 1B). The example fan array 12a is shown in FIG. 1B and includes fan assemblies 18a-18n (collectively herein "fan assembly 18" or "fan assemblies 18"). Fan assembly 18a includes motor 20a, motor controller 22a, and impeller 24a. Fan assembly 18b includes motor 20b, motor controller 22b, and impeller 24b. Fan assembly 18n includes motor 20n, motor controller 22n, and impeller 24n.

Air-handling system 10 is configured to move air in an environment according to desired ventilation parameters. For example, air-handling system 10 can be utilized in locations such as higher education facilities, data centers, healthcare facilities, pharmaceutical facilities, hospitals, manufacturing facilities, among other applications. Air-handling system 10 can be configured to provide desired volumetric flow rate and/or desired static pressure for the environment.

Air-handling system 10 includes fan arrays 12. Fan arrays 12 are configured to move the air based on the desired ventilation parameters. For example, a fan array 12 can be used to move air for intake, exhaust, exchange, pressurization, etc. The example shown includes fan array 12a, fan array 12b, and fan array 12n. It is understood that the letter "n" with respect to fan arrays 12a-12n represents an arbitrary number, such that air-handling system 10 can include any number of fan arrays 12, including a single fan array 12. As such, air-handling system 10 can include one fan array 12 or multiple fan arrays 12. In one example, a ventilation unit for a building can include a stand-alone fan array 12 disposed in a wall and configured to draw air into and/or exhaust air from an interior of the building. In a particular example, air-handling system 10 can include and/or be formed as rooftop unitary equipment configured to condition air. One or more of the fan arrays 12 can be integrated into air-handling units, such as a first fan array 12 forming an intake array and a second fan array 12 forming an exhaust array.

Each fan array 12 includes multiple fan assemblies 18. In the example shown in FIG. 1B, fan array 12a includes fan assemblies 18a-18n. It is understood that the letter "n" with respect to fan assemblies 18a-18n represents an arbitrary number, such that each fan array 12 can include two or more fan assemblies 18. Fan assemblies 18 are individual units that are arranged in parallel to generate the airflow for the fan array 12 formed by the multiple fan assemblies 18. Each fan array 12 forming air-handling system 10 can include the same number of fan assemblies 18 or different numbers of fan assemblies 18.

Each fan assembly 18 includes motor 20 and impeller 24. Impeller 24 is operably connected to motor 20 to be driven by motor 20. Fan assembly 18 can be of any desired configuration for generating pressurized airflow. For example, impeller 24 can be configured as an axial flow or centrifugal flow impeller. Motor 20 generates a rotational output to drive rotation of the impeller 24, which generates the airflow.

Motor 20 is an electronically commutated (EC) motor that includes a rectifier to convert an AC power supply to DC power and a motor controller 22. For each motor 20, the motor controller 22 directs the current to the windings of a stator of the motor 20 to drive the rotation of the rotor. Motor controller 22 regulates the current to the windings to control the torque generated and the rotational speed of motor 20. The rotor is connected to the impeller 24 to drive rotation of the impeller 24, such as by a direct drive arrangement. Each motor controller 22 is a control device configured to monitor and control the operation of its associated motor 20 to cause fan assembly 18 to generate an airflow having desired flow characteristics. Motor controller 22 controls the speed of impeller 24, thereby controlling the volumetric air flow and pressure generated by fan assembly 18. Motor controller 22 can also be referred to as a speed controller of the EC motor 20.

Control module 14 is a control device operably connected to other components of air-handling system 10, such as motor controllers 22. Control module 14 can be electrically and/or communicatively connected to the components of air-handling system 10 for monitoring and control of the components during operation of air-handling system 10. Control module 14 is configured to control the operation of the fan arrays 12 to generate the airflow required by air-handling system 10. In some examples, a master control module 14 can be operably connected to dedicated fan array control modules 14, and each of the fan array control modules 14 can be associated with one or more fan arrays 12. In some examples, control module 14 can be configured to also control the operation of air-handling components of air-handling system other than fan arrays 12.

Control module 14 can be of any desired configuration for controlling the operation of one or more fan arrays 12 and can include control circuitry and memory. Control module 14 is configured to store executable code, implement functionality, and/or process instructions. Control module 14 is configured to perform any of the functions discussed herein, including controlling operation of any components referenced herein. Control module 14 can be of any suitable configuration for controlling the operation of fan arrays 12, gathering data, processing data, etc. Control module 14 can include hardware, firmware, and/or stored software. Control module 14 can be of any type suitable for operating in accordance with the techniques described herein. While control module 14 is illustrated as a single unit, it is understood that control module 14 can be entirely or partially mounted on one or more boards. In some examples, control module 14 can be implemented as a plurality of discrete circuitry subassemblies.

While not shown for purposes of clarity and ease of illustration, each of control module 14 and motor controllers 22 includes one or more processors and computer-readable memory. Examples of the one or more processors can include any one or more of a microprocessor, a digital signal processor (DSP), an application specific integrated circuit (ASIC), a field-programmable gate array (FPGA), or other equivalent discrete or integrated logic circuitry.

Computer-readable memory can be configured to store information during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of control module 14 and/or motor controller 22 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, flash memories, or forms of electrically programmable memories (EPROM) or electrically erasable and programmable (EEPROM) memories. In some examples, the memory is used to store program instructions for execution by the control circuitry. The memory, in one example, is used by software or applications running on the control module 14 or motor controller 22 to temporarily store information during program execution.

Control module 14 is communicatively connected to motor controllers 22, such as by one or both of wired and wireless communications networks. For example, control module 14 and motor controllers 22 can be configured to communicate utilizing radiofrequency (RF) communications. In some examples, the communications circuitry can be configured for communications utilizing short-wavelength ultra high frequency (UHF) radio waves in the 2.4 GHz band (2.400-2.525 GHz) (e.g., Bluetooth® communications). In some examples, the communications circuitry can be configured for communications utilizing super high frequency (SHF) radio waves in the 5 GHz band. It is understood, however, that control module 14 and motor controllers 22 can be configured to communicate in any desired manner utilizing any suitable frequency.

Control module 14 can be configured as an input and/or output device. For example, user interface 16 can be configured to receive inputs from a user and/or provide outputs including information generated and/or provided by control module 14. Examples of user interface 16 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, buttons, dials, or other type of user interface device for facilitating input and/or output of information in a form understandable to users or machines. User interface 16 can be integrated with control module 14 or formed as a separate device. For example, user interface 16 can be a smartphone, tablet, or other such device. User interface 16 can be connected to control module 14 by wired and/or wireless communications networks.

Air-handling system 10 is operated to provide desired airflow for the environment associated with air-handling system 10. Fan arrays 12 are controlled based on desired volumetric flow and/or static pressure, among other ventilation parameter options. Control module 14 is configured to generate and/or provide control signals to the motor controllers 22 to control operation of the various fan assemblies 18. Control signals are provided to the motor controllers 22 to individually control operation of each fan assembly 18. The control signals provide various commands to the motor controllers 22 to control operation of the motor 20 to alter the flow and pressure from that fan assembly 18. The motor controllers 22 operate the associated motors 20 based on the commands provided by the control signals. The control signals from control module 14 provide instructions to motor controllers 22 to cause motor controllers 22 to operate motors 20. For example, the control signals can provide speed commands to the motor controllers 22 to cause the motor controllers 22 to adjust a speed of an associated motor 20.

Each motor controller 22 has one or more associated motor operating parameters that are stored in the memory of that motor controller 22. The motor operating parameters can provide instructions to the motor controller 22 for interpreting and implementing commands received from control module 14. Each motor controller 22 controls operation of its associated motor 20 based on the one or more motor operating parameters. In some examples, the motor operating parameters are stored in non-volatile memory of the motor controller 22. The motor operating parameters of each motor 20 can be stored in the memory of the motor controller 22 of that motor 20 in a read-write format.

The motor operating parameters can define operational limits (e.g., speed, acceleration, etc.) regarding motor 20. The motor operating parameters can include, among other options, demand source selection (e.g., analog control signal, digitally communicated control signal, which input, etc.); fan enable selection (e.g., whether an external contact is required to run the fan, and if so, which one, whether close or open contact enables operation, etc.); operating mode (e.g., open loop modulation, closed loop speed control, based on an internal or external sensor, etc.); ramp-up time (e.g., maximum allowable acceleration rate); ramp-down time (e.g., maximum allowable deceleration rate); demand signal curve (e.g., minimum desired speed, maximum desired speed, which analog signals correspond to minimum/maximum/other speed, etc.); signal break voltage (e.g., minimum voltage for a valid demand signal); fail-safe control mode (operating state when demand signal lost/invalid); fail-safe speed (desired speed if operating in fail-safe mode); etc. The motor operating parameters for each fan assembly 18 are set for that fan assembly 18 and stored in the motor controller 22 memory. The motor operating parameters can vary between different ones of the fan assemblies 18.

The motor operating parameters for each motor controller 22 are set to desired values such that the command signals from control module 14 produce the desired response and output from the motor controller 22 receiving the command. The motor controllers 22 are intended to have expected operating parameters and expected operating parameter values. The expected operating parameters are the motor operating parameters that motor controller 22 is intended to have stored in its memory. The expected operating parameter values are the values for each motor operating parameter that the motor controller 22 should have stored in memory to properly interpret command signals. The control module 14 is configured to provide instructions to motor controllers 22 based on the expected parameter values. The expected parameter values can vary from initial or manufacturer-set parameter values. The expected parameter values for each fan array 12 and/or fan assembly 18 can be stored in the memory of control module 14 as the expected parameter configuration according to which the control module 14 provides instructions to the motor controllers 22.

The actual motor operating parameters are the motor operating parameters actually stored in the memory of a motor controller 22. The actual operating parameter values are the motor operating parameter values that are actually stored in the memory of the motor controller 22. The motor controller 22 interprets and reacts to instructions from the control module 14 based on the actual operating parameter values. For example, a first motor controller 22 can include stored motor operating parameters specifying that a 10V command signal is a maximum speed command and that the maximum speed is 2500 RPM, while a second motor controller 22 can include stored motor operating parameters specifying that an 8V command signal is a maximum speed command and that the maximum speed is 3000 RPM. The same 8V command signal provided to the first and second motor controllers 22 will cause different reactions and outputs from the fan assemblies 18 of those motor controllers 22.

In some examples, each fan array 12 can be configured to have an array operating parameter configuration. The array operating parameter configuration can provide the expected operating parameters and values for each motor controller 22 forming that fan array 12. For example, a fan array 12 can be configured such that each fan assembly 18 forming the fan array 12 is commonly configured. For example, each of motor controllers 22a-22n shown in FIG. 1B can have the same expected parameter values. In one example, each of motor controllers 22a-22n can be configured to have the same demand signal curve such that the same command signal provides the same speed command to each fan assembly 18a-18n. For example, the expected parameter value stored in each motor controller 22 of fan assembly 18a can indicate that a 2V command signal is a minimum speed command and a 10V command signal is a maximum speed command. Having each motor controller 22 of a fan array 12 configured based on a common parameter configuration (e.g., the same array operating parameter configuration) simplifies control and operation of fan array 12 as common signals cause the same reaction and operation at each fan assembly 18 of the fan array 12. It is understood, however, that the expected operating parameter values can vary between fan arrays 12 and, in some examples, can vary between motor controllers 22 within a single fan array 12.

Control module 14 is configured to generate and send instructions to motor controllers 22 based on the expected parameter values. Motor controllers 22 control the operation of the associated motors 20 based on the actual parameter values of that motor controller 22. The actual parameter values for each motor controller 22 should be the same as the expected parameter values. The actual parameter values varying from the expected parameter values is undesirable and can cause inefficient operation, undesired volumetric flow, undesired pressures, among other potential issues.

Discrepancies between the actual parameter values and the expected parameter values need to be identified to ensure desired outputs from each fan array 12. Discrepancies can arise at any time during the operation of air-handling system 10. For example, individual ones of fan assemblies 18 can be replaced. The motor operating parameters of the replacement fan assembly 18 need to be configured such that the actual operating parameter values of the motor controller 22 in the replacement fan assembly 18 match the expected operating parameter values for the location of that replacement fan assembly 18.

During operation, control module 14 is configured to determine a parameter status of one or more of fan assemblies 18. While the parameter status determinations are discussed with regard to motor operating parameter values, it is understood that discussion equally applies to a parameter status determination regarding the motor operating parameters themselves. For example, control module 14 can determine whether the motor controller 22 has the correct motor operating parameters in addition or alternatively to determining a parameter status based on the values of the operating parameters that are stored in the motor controller 22. Control module 14 can be configured to determine the parameter status for multiple fan assemblies 18 associated with control module 14. For example, control module 14 can be configured to determine the parameter statuses of up to all of the fan assemblies 18 of a fan array 12. Control module 14 can be configured to determine a parameter status for fan assemblies 18 across multiple ones of fan arrays 12, such as in examples where control module 14 is operatively associated with more than one fan array 12. For example, control module 14 can be configured to determine the parameter status of each fan assembly 18 in each fan array 12 associated with control module 14.

Control module 14 initiates a parameter status determination for a target fan assembly 18 by generating a parameter status inquiry and sending the parameter status inquiry to a target motor controller 22. In response to the parameter status inquiry, the motor controller 22 provides the actual operating parameter values for that motor controller 22 to control module 14. Control module 14 compares the actual operating parameter values for that motor controller 22 to the expected operating parameter values for that motor controller 22. For example, control module 14 can recall the expected operating parameter values from a memory of control module 14. Control module 14 can recall the expected operating parameter values based on an address of the motor controller 22 within the communications network. The expected operating parameter values are thus associated with a location within air-handling system 10 rather than with a particular motor controller 22.

The control module 14 compares the actual operating parameter values with the expected operating parameter values to determine if a variation exists. The parameter status determination can be one of a valid status and an invalid status. In some examples, control module 14 is configured such that the parameter status determination is binary. For example, any variation between the actual parameter values received from the motor controller 22 and the expected parameter values can result in an invalid status determination. The invalid status can be associated with the fan assembly 18 generally and/or can be associated with the one or more motor parameters that caused the invalid status. A valid status determination is made when the actual operating parameter values match the expected operating parameter values. In some examples, control module 14 is configured to determine an invalid status based on a determination count threshold. Control module 14 can be configured to determine that an invalid status exists based on the invalid status determination being made multiple times. For example, if the determination count threshold is two, then an invalid status is determined to exist when the actual parameter value varies from the expected parameter value across two separate inquiries. It is understood that the determination count threshold can be any desired number of parameter status determinations, such as one, two, three, or more.

Control module 14 can store the invalid status in the memory of control module 14 and/or can provide an error notification to the user. Control module 14 can generate and provide the error notification regarding the invalid status to the user via user interface 16. For example, control module 14 can be configured to generate an alert or trigger an alarm based on an invalid status determination being made. Control module 14 can provide the invalid status determination notification when the invalid status determination is made or after a scan is complete, as discussed in more detail below.

Figure 2:
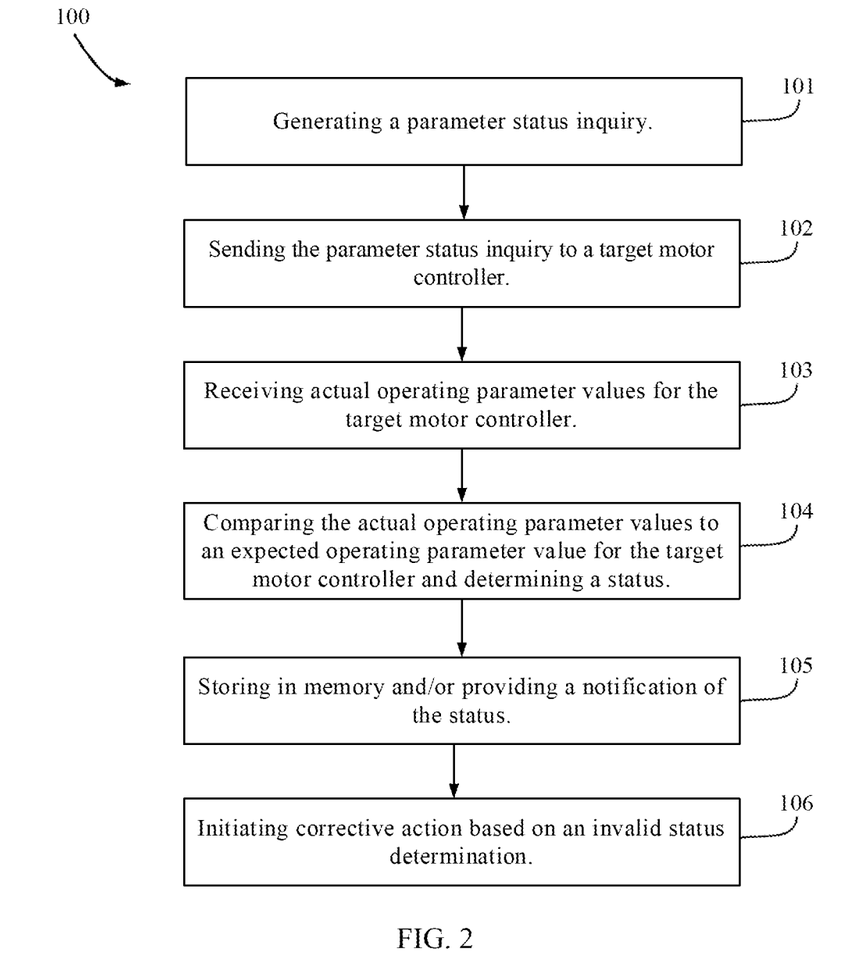
FIG. 2 is a method of diagnosing and monitoring fan assemblies, according to an example of the present disclosure.

FIG. 2 shows a method 100 of diagnosing and monitoring fan assemblies in accordance with the present disclosure. The method may be, for example, applied to a control module 14.

In step 101, the control module 14 may generate a parameter status inquiry.

In step 102, the control module 14 may send the parameter status inquiry to a target motor controller.

In step 103, the control module 14 may receive actual operating parameter values for the target motor controller.

In step 104, the control module 14 may compare the actual operating parameter values to an expected operating parameter value for the target motor controller and determining a status.

In step 105, the control module 14 may store in memory and/or provide a notification of the status.

In step 106, the control module 14 may initiate corrective action based on an invalid status determination.

Control module 14 can be configured to initiate corrective action based on an invalid status determination. Control module 14 can thus initiate a parameter correction for motor controller 22. Control module 14 can thus reconfigure the parameters of target ones of the motor controllers 22 based on expected parameter values, thus initiating a repair of that unit. In some examples, control module 14 can generate and provide a reconfiguration prompt to the user, such as via user interface 16, based on the invalid status determination. The reconfiguration prompt can ask the user whether control module 14 should rewrite the motor operating parameter values of the target motor controller 22 to be the expected operating parameter values. The control module 14 can write the expected operating parameter values to the target motor controller 22 based on an affirmative reply from the user. As such, the user can provide a reconfigure command to the control module 14 to cause the control module 14 to update the actual parameter values of the target motor controller 22 based on the expected parameter values.

Figure 3:
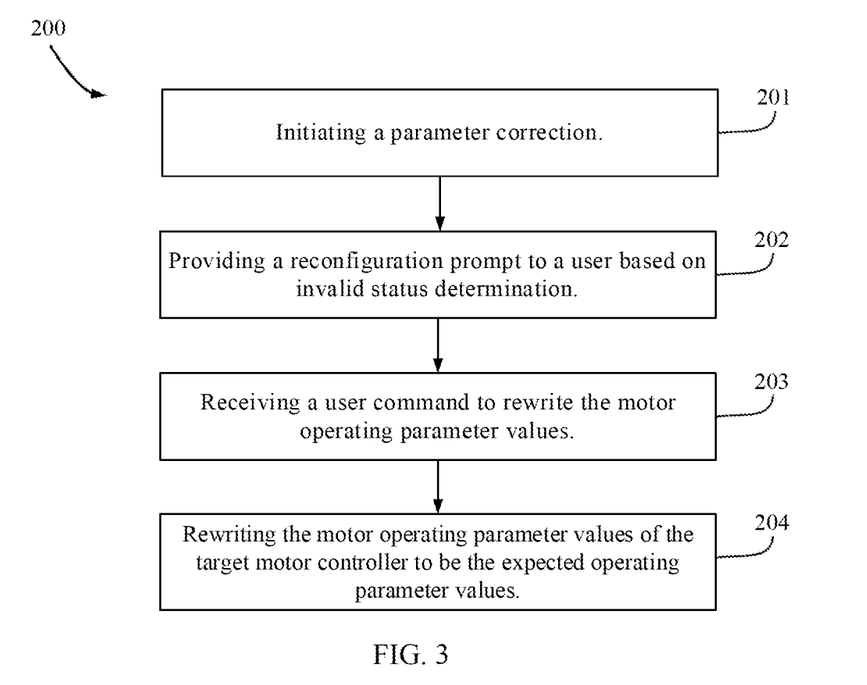
FIG. 3 is a method of initiating a parameter correction, according to an example of the present disclosure.

FIG. 3 shows a method 200 of initiating a parameter correction in accordance with the present disclosure. The method may be, for example, applied to a control module 14.

In step 201, the control module 14 may initiate a parameter correction.

In step 202, the control module 14 may provide a reconfiguration prompt to a user based on invalid status determination.

In step 203, the control module 14 may receive a user command to rewrite the motor operating parameter values.

In step 204, the control module 14 may rewrite the motor operating parameter values of the target motor controller to be the expected operating parameter values.

Figure 4:
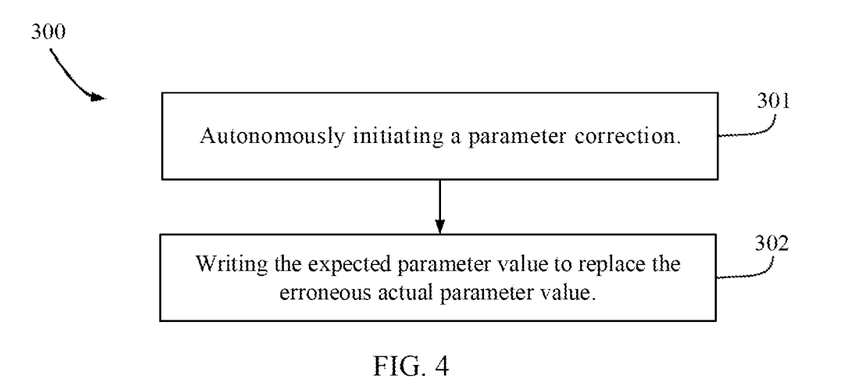
FIG. 4 is a method of autonomously initiating a parameter correction, according to an example of the present disclosure.

In some examples, control module 14 is configured to autonomously take corrective action for the target motor controller 22. For example, control module 14 can reconfigure motor controller 22 by writing the expected parameter values to the motor controller 22 to replace the erroneous actual parameter values based on control module 14 making an invalid status determination. For example, the control module 14 can be configured to autonomously initiate a repair sequence during which the control module 14 writes the expected parameter value to the motor controller 22 to replace the erroneous actual parameter value. As such, the repair sequence can be autonomously initiated and proceeded through by the control module 14 or can be initiated based on a signal received from a user, among other options. Both the autonomous and user-initiated repair sequences can be considered to be initiated based on a command signal, which is generated by the control module 14 with the autonomous repair sequence and is generated by the user in the user-initiated repair sequence.

FIG. 4 shows a method 300 of autonomously initiating a parameter correction in accordance with the present disclosure. The method may be, for example, applied to a control module 14.

In step 301, the control module 14 may autonomously initiate a parameter correction.

In step 302, the control module 14 may write the expected parameter value to replace the erroneous actual parameter value.

Control module 14 can, in some examples, generate and send a supplemental parameter status inquiry to the target motor controller 22. The control module 14 can validate, based on the actual parameter value received from target motor controller 22 in response to the supplemental parameter status inquiry, whether the expected parameter values have been applied to the target motor controller 22. Control module 14 can provide a notification to the user, such as via user interface 16, that the target motor controller 22 has been properly reconfigured.

In some examples, control module 14 can record in its memory the fact that the motor operating parameter values for a motor controller 22 were reconfigured by control module 14. Control module 14 can keep a count of reconfigurations and can provide that information to the user, such as via user interface 16. The actual parameter values can be stored in non-volatile memory of the motor controller 22, which memory can be damaged by writing to the memory too many times. The count assists the user in determining whether to reconfigure the operating parameter values of the target motor controller 22. In some examples, control module 14 is configured to automatically reconfigured the actual parameter values of the target motor controller 22 based on the count being at or less than a threshold. Control module 14 can be configured to provide the reconfiguration prompt to the user based on the count being at or greater than the threshold. For example, control module 14 can be configured to automatically reconfigure the actual parameter values if it is the first reconfiguration and to not take automatic action if motor controller 22 has previously been configured by control module 14.

Control module 14 determining the parameter status for a single motor controller 22 is discussed above. Control module 14 can be configured to determine the parameter statuses of multiple ones of motor controllers 22 across one or more fan arrays 12. For example, control module 14 can be configured to serially determine the parameter status of multiple fan assemblies 18 in a fan array 12 or of fan assemblies 18 in more than one fan array 12. Control module 14 can be configured to serially determine the parameter status of each fan assembly 18 in a first fan array 12 and then each fan assembly 18 in a second fan array 12. During a serial parameter status determination, the control module 14 can determine the parameter statuses of the motor controllers 22 in a stepwise manner. As such, control module 14 can be configured to determine the parameter status of a subset of the motor controllers 22 at any given time before determining the parameter statuses of a next subset of motor controllers 22. In some examples, control module 14 is configured to determine the parameter status of a single motor controller 22 at a given time before determining the parameter status of a next motor controller 22 in the scan order.

For example, control module 14 can determine the parameter status of a target motor controller 22. After making that parameter status determination, control module 14 determines the parameter status of the next one of the motor controllers 22. Control module 14 can determine the parameter status of each fan assembly 18 in fan array 12a, then determine the parameter status of each fan assembly 18 in fan array 12b, etc. Control module 14 can continue making parameter status determinations until a parameter status for each fan assembly 18 has been determined.

Control module 14 is configured to actively monitor the actual motor operating parameters of fan assemblies 18 to determine the parameter statuses. An example scan process is described in more detail below. In the example scan event, control module 14 is operably associated with fan array 12*a*, having fan assemblies 18*a*-18*n*, and with fan array 12*b*, assumed to have four fan assemblies 18 as shown in FIG. 1A.

Control module 14 initiates the status determination mode to determine the parameter status of each fan assembly 18. Control module 14 knows the communication addresses of the various motor controllers 22 in air-handling system 10. Control module 14 initiates a parameter scan and determines the parameter statuses of the fan assemblies 18 based on a scan order. In the example discussed, the scan order begins at the first fan assembly 18 of fan array 12*a* (e.g., fan assembly 18*a*) and proceeds through the fan assemblies 18 of fan array 12*a* to the last fan assembly 18 of fan array 12*a* (e.g., fan assembly 18*n*). Next in the scan order is fan array 12*b*, beginning with the first fan assembly 18 of fan array 12*b* and ending with the last (e.g., fourth) fan assembly 18 of fan array 12*b*.

Control module 14 generates and sends a parameter inquiry to a first address in the scan order. In the example discussed, motor controller 22*a* of fan assembly 18*a* is disposed at the first address location. As discussed above, the control module 14 generates and sends a parameter status inquiry to motor controller 22*a*. Control module 14 receives the actual motor operating parameter values from motor controller 22*a* and makes the parameter status determination based on those actual motor operating parameter values and based on the expected motor operating parameter values for the location of the first address, which is the location of fan assembly 18*a* of motor controller 22*a* within air-handling system 10. After determining the parameter status of motor controller 22*a*, control module 14 determines the parameter status of the serially next motor controller 22 in the scan order.

Control module 14 generates and sends a parameter inquiry to the second address in the scan order (e.g., the address location of motor controller 22*b* of fan assembly 18*b*). Control module 14 receives the actual motor operating parameter values from motor controller 22*b* and makes the parameter status determination based on those actual motor operating parameter values and based on the expected motor operating parameter values for the location of the fan assembly 18*b* of motor controller 22*b* within air-handling system 10. Control module 14 continues to serially generate and send parameter inquiries to the motor controllers 22 of fan array 12*a* such that a parameter status determination is made for each of the motor controllers 22 of fan array 12*a*.

In some examples, control module 14 is configured to implement a time delay between sending each parameter status inquiry. For example, control module 14 can be configured to implement a delay of thirty seconds, one minute, two minutes, five minutes, or more between sending inquiries and/or making the parameter status determinations. Implementing the delay frees bandwidth on the communication network of air-handling system 10.

After determining the parameter status of each motor controller 22 in the first fan array 12 in the scan order (e.g., fan array 12*a* in the example discussed), control module 14 can determine the parameter statuses of the motor controllers 22 in the serially next fan array 12 in the scan order (e.g., fan array 12*b* in the example discussed). Control module 14 generates and sends a parameter status inquiry to the first motor controller 22 of fan array 12*b* according to the scan order and determines the status of that first motor controller 22 based on the actual motor operating parameter values received from that first motor controller 22 and based on the expected motor operating parameter values for that first motor controller 22. Control module 14 continues to determine the parameter status for each motor controller 22 of fan array 12*b*. While control module 14 is described as making parameter status determinations for fan array 12*a* before making parameter status determinations for fan array 12*b*, it is understood that the scan order can be any desired order. For example, the scan order can include a fan assembly 18 from fan array 12*b* at a location in the scan order between two fan assemblies 18 of fan array 12*a*. In some examples, the scan order can be based on a parameter type. For example, control module 14 can send a parameter inquiry regarding a first parameter to the various fan assemblies 18 to determine a status of that first parameter. The control module 14 can then determine the status of a second parameter. As such, the control module 14 can, in some examples, make a parameter status determination for a first parameter, then a status determination for a second parameter, etc. for each of the motor operating parameters.

As discussed above, the expected motor operating parameter values can vary between the motor controllers 22 of different fan arrays 12 and between the motor controllers 22 within a fan array 12. As such, the expected motor operating parameter values can be associated with the various fan assembly 18 addresses throughout air-handling system 10 and stored in the memory of control module 14. Control module 14 can individually recall the expected motor operating parameter values for each motor controller 22 from the memory of control module 14 based on the address that the parameter status inquiry was sent to or that a reply to the parameter status inquiry was received from. In examples where motor controllers 22 are commonly configured, such as across a single fan array 12, control module 14 can recall a single set of expected motor operating parameter values for that fan array 12 (e.g., an array operating parameter values) and utilize that information as the expected motor operating parameter values for the parameter status determination.

As discussed above, control module 14 can provide an error notification and/or initiate corrective action for any misconfigured motor controllers 22. Control module 14 can be configured to provide the error notification and/or initiate corrective action at the time an invalid status is determined (e.g., mid-scan), after the scan is complete, based on an invalid status count threshold, and/or at any other time during operation. For example, if control module 14 determines that motor controller 22*d* of fan array 12*a* has an invalid status, then control module 14 can generate and provide the error notification to the user when the invalid status is determined or after the scan is complete. In some examples, there may be a delay in receiving a response form the user. Control module 14 can continue the scan and make parameter status determinations for other motor controllers 22. Control module 14 can be configured to reconfigure the motor controller 22 having the invalid status determination when the reconfiguration command is received (e.g., from the user), regardless of the actual target motor controller 22 that control module 14 is scanning at that time.

In some examples, control module 14 can determine that the error exists and provide the error notification and/or initiate corrective action based on the invalid status count threshold. Control module 14 can thereby require one or more invalid statuses before determining that the error actually exists. For example, if the invalid status count threshold is two, then control module 14 will provide the error notification and/or initiate corrective action once two invalid status determinations have been made for a fan assembly 18. It is understood that the invalid status count threshold can be any desired number of invalid statuses, such as one, two, three, four, or more. The multiple invalid statuses can be determined across multiple scans and/or control module 14 can repeat the parameter status determination based on an initial invalid status determination. For example, if control module 14 makes an invalid status determination, control module 14 can immediately reinitiate the parameter status determination for that fan assembly 18. In other examples, control module 14 stores the invalid status determination in memory and continues with the scan. The multiple invalid status determinations, when the invalid status threshold count is more than one, counteract nuisance notifications and assist in ensuring that the error is a true error before taking corrective action.

Control module 14 can be configured to operate in a repeating scan mode during which the control module 14 automatically repeats the parameter status scan. For example, after completing the parameter determination process for fan array 12*a* and then fan array 12*b*, control module 14 can restart the scan at the first target motor controller 22 in the scan sequence (e.g., motor controller 22*a* in the example discussed). In some examples, control module 14 can immediately restart the scan process after completing a previous scan, such that control module 14 operates in a continuous scan mode. In some examples, control module 14 can implement a delay between subsequent scans, such that control module 14 operates in a periodic scan mode. For example, control module 14 can be configured to implement one scan per scan period, which scan period can be one day, one week, one month, etc.

The parameter status determination process and system provide significant advantages. Traditionally, a user is required to connect to each motor controller 22 in the air-handling system 10 to determine the parameter statuses, which can include hundreds or thousands of fan assemblies 18 and motor controllers 22. For example, the user can be required to wire into each motor controller 22 to determine the parameter status of that motor controller 22, or the user can wirelessly connect to the individual fan assemblies 18. However, such connections can be prone to errors due to the large number of fan assemblies 18 (e.g., the user may be connected to a different fan assembly 18 than expected or may have incorrect expected operating parameters for the target motor controller 22). Control module 14 determines the parameter status of the motor controllers 22, thereby quickly and efficiently determining statuses and identifying errors, reducing costs, and reducing time committed to monitoring the motor operating parameters. Control module 14 automatically repeating the scan process, continuously or periodically, identifies errors that arise due to a faulty motor controller 22 or due to replacement of a fan assembly 18. For example, motor controller 22*b* can have a valid status during a first scan and then the fan assembly 18*b* could be replaced with a new fan assembly 18*b* having incorrect motor operating parameters. Control module 14 will identify such errors on subsequent scans. Control module 14 can take corrective action when incorrect motor operating parameters are identified, quickly and efficiently alerting the user to any errors and correcting those errors, thereby reducing the prevalence and residence time of system errors, increasing system efficiency, and increasing user confidence. Control module 14 can automatically write the expected motor operating parameters to a motor controller 22 in response to an invalid status, minimizing the time that errors are present and increasing system efficiency.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air-handling system comprising:
   a first fan array including:
   a first fan assembly having a first motor operatively connected to a first impeller, the first motor including a first motor controller; and
   a second fan assembly having a second motor operatively connected to a second impeller, the second motor including a second motor controller; and
   a control module including control circuitry and memory, the control module operatively connected to the first fan assembly and the second fan assembly, the control module configured to:
   generate a first parameter status inquiry;
   send the first parameter status inquiry to the first motor controller;
   receive a first actual parameter value from the first motor controller in response to the first parameter status inquiry;
   compare the first actual parameter value and a first expected parameter value;
   determine a parameter status of the first motor controller based on the comparison of the first actual parameter value and the first expected parameter value; and
   write the first expected parameter value to the first motor controller as the first actual parameter value based on the parameter status of the first actual parameter value being an invalid parameter status.

2. The air-handling system of claim 1, wherein the control module is further configured to recall the first expected parameter value from the memory of the control circuitry.

3. The air-handling system of claim 1, wherein the control module is further configured to:
   generate a second parameter status inquiry;
   send the second parameter status inquiry to the second motor controller;
   receive a second actual parameter value from the second motor controller in response to the second parameter status inquiry;
   compare the second actual parameter value and a second expected parameter value; and
   determine a parameter status of the second motor controller based on the comparison of the second actual parameter value and the second expected parameter value.

4. The air-handling system of claim 3, wherein the first expected parameter value is the same as the second expected parameter value.

5. The air-handling system of claim 3, wherein the control module is further configured to:

implement a delay between determining the parameter status of the first motor controller and sending the second parameter status inquiry to the second motor controller.

6. The air-handling system of claim 1, wherein the control module is further configured to:
generate an error notification for the first motor controller based on the first actual parameter value differing from the first expected parameter value.

7. The air-handling system of claim 1, wherein the first motor is an electronically commutated motor and the second motor is an electronically commutated motor.

8. The air-handling system of claim 1, further comprising:
a second fan array having a plurality of third fan assemblies each having a third motor operatively connected to a third impeller, wherein each of the third motors includes a third motor controller;
wherein the control module is operatively connected to the third motor controllers, and wherein for each third motor controller the control module is configured to:
generate a third parameter status inquiry;
send the third parameter status inquiry to the third motor controller;
receive a third actual parameter value from the third motor controller in response to the third parameter status inquiry;
compare the third actual parameter value and a third expected parameter value;
determine a parameter status of the third motor controller based on the comparison of the third actual parameter value and the third expected parameter value; and
write the third expected parameter value to the third motor controller as the third actual parameter value based on the parameter status of the third actual parameter value being an invalid parameter status.

\* \* \* \* \*